United States Patent
Wu (10) Patent No.: US 11,422,604 B2
(45) Date of Patent: Aug. 23, 2022

(54) DEVICE, CABINET, AND METHOD FOR PREVENTING POWER OUTAGE OF ENTIRE CABINET

(71) Applicant: INSPUR ELECTRONIC INFORMATION INDUSTRY CO., LTD., Shandong (CN)

(72) Inventor: Fukuan Wu, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 972 days.

(21) Appl. No.: 16/097,163

(22) PCT Filed: Jul. 20, 2017

(86) PCT No.: PCT/CN2017/093615
§ 371 (c)(1),
(2) Date: Oct. 26, 2018

(87) PCT Pub. No.: WO2018/040777
PCT Pub. Date: Mar. 8, 2018

(65) Prior Publication Data
US 2021/0223843 A1    Jul. 22, 2021

(30) Foreign Application Priority Data
Aug. 29, 2016 (CN) .......................... 201610751811.4

(51) Int. Cl.
*G06F 1/30* (2006.01)
*H02H 3/02* (2006.01)
(Continued)

(52) U.S. Cl.
CPC .............. *G06F 1/30* (2013.01); *H02H 3/023* (2013.01); *H02H 3/087* (2013.01); *H02H 3/445* (2013.01)

(58) Field of Classification Search
CPC .......... G06F 1/30; G06F 1/26; G06F 11/0796; H02H 3/023; H02H 3/087; H02H 3/445;
(Continued)

(56) References Cited

U.S. PATENT DOCUMENTS 5,325,062 A * 6/1994 Bachand .................. H02H 3/05
324/133
5,754,384 A * 5/1998 Ashley .................. H02J 7/0031
361/126
(Continued)

FOREIGN PATENT DOCUMENTS

CN          2526995 Y      12/2002
CN        203339652 U      12/2013
(Continued)

OTHER PUBLICATIONS

International Search Report for PCT/CN2017/093615 dated Sep. 27, 2017, ISA/CN.

*Primary Examiner* — Faisal M Zaman
(74) *Attorney, Agent, or Firm* — Yue (Robert) Xu; Apex Attorneys at Law, LLP (57) ABSTRACT

There are provided a device for preventing an entire cabinet from being powered down, a cabinet, and a method for preventing an entire cabinet from being powered down. The device includes a diode and a first protection circuit. An anode of the diode is grounded, a cathode of the diode is connected to an external voltage supplying copper busbar via the first protection circuit, and the diode is connected in parallel with an external node. The first protection circuit is arranged to monitor a current flowing through the diode, and cut off a connection line between the diode and the voltage supplying copper busbar in a case that the current exceeds a preset fusing current threshold.

11 Claims, 5 Drawing Sheets

(51) Int. Cl.
*H02H 3/087* (2006.01)
*H02H 3/44* (2006.01)

(58) Field of Classification Search
CPC . H02H 9/004; H02H 9/041; H02J 9/06; H02J 9/061; H01R 13/68; H01R 13/6658; H01R 13/6666; H01H 85/202; H01H 85/545; H01H 85/0241; H01H 85/30; H01H 2085/209; H01H 85/20; H02B 1/26; H02B 3/00; H02B 1/20; H02B 1/30
USPC ... 361/622, 642, 624, 648, 104, 626, 118, 1, 361/18; 713/300
See application file for complete search history.

(56) References Cited

U.S. PATENT DOCUMENTS

| | | | |
|---|---|---|---|
| 6,201,721 B1 * | 3/2001 | Suranyi | H02H 9/004 307/147 |
| 2003/0016481 A1 * | 1/2003 | Hernandez | H02H 3/046 361/104 |
| 2006/0227481 A1 * | 10/2006 | Huang | G06F 1/26 361/104 |
| 2009/0168469 A1 * | 7/2009 | Dishman | H02J 1/102 363/65 |
| 2012/0229937 A1 * | 9/2012 | Ramamurthy | H02H 5/047 361/18 |
| 2014/0254210 A1 | 9/2014 | Hayasaki et al. | |
| 2015/0372476 A1 * | 12/2015 | Moen | H04L 12/40045 361/86 |

FOREIGN PATENT DOCUMENTS

| | | |
|---|---|---|
| CN | 203826947 U | 9/2014 |
| CN | 204231016 U | 3/2015 |
| CN | 105356431 A | 2/2016 |
| CN | 106160199 A | 11/2016 |

* cited by examiner

DEVICE, CABINET, AND METHOD FOR PREVENTING POWER OUTAGE OF ENTIRE CABINET

The present application is the national phase of PCT International Patent Application PCT/CN2017/093615, filed on Jul. 20, 2017 which claims the priority to Chinese Patent Application No. 201610751811.4, titled "DEVICE, CABINET, AND METHOD FOR PREVENTING POWER OUTAGE OF ENTIRE CABINET", filed with the Chinese Patent Office on Aug. 29, 2016, both of which are incorporated herein by reference in their entireties.

FIELD

The present disclosure relates to the technical field of servers, and in particular to a device for preventing an entire cabinet from being powered down, a cabinet, and a method for preventing an entire cabinet from being powered down.

BACKGROUND

With the continuous development of cloud computing technology, a cabinet having a hot-plugging function is widely used by users. Currently, the hot-plugging is realized mainly by arranging a hot-plugging board in a node in the cabinet. However, a high instantaneous voltage is usually generated in hot-plugging, which causes a chip connected to the hot-plugging board to be damaged.

Currently, in order to prevent the connected chip from being damaged due to hot-plugging to and stabilize a voltage of the node in hot-plugging, a diode is generally arranged at a front end of the node and is connected in parallel with the node, so as to stabilize the voltage of the node in hot-plugging. The cabinet centrally supplies power for nodes by using a power supplying copper busbar. In this case, once a diode connected in parallel with any one of the nodes is short-circuited, a positive electrode of the power supplying copper busbar is shorted to the ground, and the voltage of the power supplying copper busbar is pulled down, and thus the power supplying copper busbar cannot supply enough power for the nodes, resulting in the entire cabinet being powered down and unreliable power supplying of the entire cabinet server.

SUMMARY

There are provided a device for preventing an entire cabinet from being powered down, a cabinet, and a method preventing an entire cabinet from being powered down according to embodiment of the present disclosure, to effectively improve the power supplying reliability of the cabinet server.

There is provided a device for preventing an entire cabinet from being powered down, applied to each node in the cabinet. The device includes a diode and a first protection circuit, an anode of the diode is grounded, a cathode of the diode is connected to an external voltage supplying copper busbar via the first protection circuit, and the diode is connected in parallel with an external node; and the first protection circuit is arranged to monitor a current flowing through the diode, and cut off a connection line between the diode and the voltage supplying copper busbar in a case that the current exceeds a preset fusing current threshold.

Preferably, the first protection circuit includes a fuse;

a first connection terminal of the fuse is connected to the cathode of the diode, and a second connection terminal of the fuse is connected to the external voltage supplying copper busbar; and when the diode is short-circuited, the fuse is fused, to cut off the connection line between the diode and the external voltage supplying copper busbar.

Preferably, the device further includes a signal pin and a second protection circuit, an input terminal of the signal pin is arranged between the cathode of the diode and the first protection circuit, and an output terminal of the signal pin is connected to the second protection circuit;

the signal pin is configured to: output a high level in a case that a voltage drop across the first protection circuit is not zero, and output a low level in a case that the voltage drop across the first protection circuit is zero; and the second protection circuit is arranged on a hot-plugging board in the external parallel-connected node, and is configured to: control the external parallel-connected node to take power from the voltage supplying copper busbar in a case that the second protection circuit receives the high level outputted by the signal pin, and control the external parallel-connected node not to take power from the voltage supplying copper busbar in a case that the second protection circuit receives the low level outputted by the signal pin.

Preferably, the second protection circuit includes: a logic circuit, an AND gate circuit, and a control chip, the AND gate circuit includes two input terminals and one output terminal;

the logic circuit is arranged to monitor an operating state of the node, and output a high level in a case that the node operates normally;

a first input terminal of the AND gate circuit is connected to the logic circuit, a second input terminal of the AND gate circuit is connected to the signal pin, and the output terminal of the AND gate circuit is connected to the control chip, and the AND gate circuit is configured to: receive the high level outputted by the logic circuit via the first input terminal, output a high level to the control chip via the output terminal in a case that the AND gate circuit receives the high level outputted by the signal pin via the second input terminal, and output a low level to the control chip via the output terminal in a case that the AND gate circuit receives the low level outputted by the signal pin via the second input terminal; and the control chip is configured to: control the node to operate normally in a case that the control chip receives the high level outputted by the AND gate circuit via the output terminal; and control the external parallel-connected node not to take power from the voltage supplying copper busbar and output an abnormity alarm signal, in a case that the control chip receives the low level outputted by the AND gate circuit via the output terminal.

Preferably, a rated power of the fuse is greater than a power of the external parallel-connected node in hot-plugging and less than a power of the connected diode.

A cabinet is provided. The cabinet includes: one or more devices for preventing an entire cabinet from being powered down according to any one of claims 1 to 5, a voltage supplying copper busbar, and one or more nodes, each of the one or more devices for preventing an entire cabinet from being powered down is connected to the voltage supplying copper busbar in parallel with one of the nodes, and is configured to: stabilize a voltage of the parallel-connected node in hot-plugging, and cut off power supplying to the node when a short circuit occurs;

the voltage supplying copper busbar is configured to provide a power supplying voltage for each of the one or more nodes; and each of the one or more nodes is configured to receive the power supplying voltage provided by the voltage supplying copper busbar.

There is provided a method for preventing an entire cabinet from being powered down, applied to each node in the cabinet. The method includes:

grounding an anode of a diode, connecting a cathode of the diode to a voltage supplying copper busbar via a first protection circuit, and connecting the diode in parallel with a node in the cabinet; and monitoring, a current flowing through the diode by using the first protection circuit, and cutting off a connection line between the diode and the voltage supplying copper busbar in a case that the current exceeds a preset fusing current threshold.

Preferably, the first protection circuit includes a fuse, connecting a cathode of the diode to a voltage supplying copper busbar via a first protection circuit includes: connecting a first connection terminal of the fuse to the cathode of the diode; and connecting a second connection terminal of the fuse to an external voltage supplying copper busbar; and the cutting off a connection line between the diode and the voltage supplying copper busbar includes: fusing the fuse to cut off the connection line between the diode and the external voltage supplying copper busbar, when the diode is short-circuited.

Preferably, the method further includes: arranging a signal pin between the cathode of the diode and the first protection circuit, where the signal pin is configured to: output a high level in a case that a voltage drop across the first protection circuit is not zero, and output a low level in a case that the voltage drop across the first protection circuit is zero; and after cutting off the connection line between the diode and the voltage supplying copper busbar, the method further includes: outputting, by the signal pin, a high level, and controlling the external parallel-connected node to take power from the voltage supplying copper busbar; and outputting, by the signal pin, a low level, and controlling the external parallel-connected node not to take power from the voltage supplying copper busbar.

Preferably, the method further includes:

arranging a logic circuit, an AND gate circuit and a control chip on the node;

connecting a first input terminal of the AND gate circuit to the logic circuit, connecting a second input terminal of the AND gate circuit to the signal pin, and connecting an output terminal of the AND gate circuit to the control chip; and outputting, by the logic circuit, a high level in a case that the node operates normally, where after outputting, by the signal pin, a high level and before controlling the external parallel-connected node to take power from the voltage supplying copper busbar, the method further includes: receiving, by the AND gate circuit, the high level outputted by the signal pin and the high level outputted by the logic circuit; and outputting, by the AND gate circuit, a high level to the control chip via the output terminal;

the controlling the external parallel-connected node to take power from the voltage supplying copper busbar includes: controlling, by the control chip, the node to operate normally;

after outputting, by the signal pin, a low level and before controlling the external parallel-connected node not to take power from the voltage supplying copper busbar, the method further includes: receiving, by the AND gate circuit, the low level outputted by the signal pin and the high level outputted by the logic circuit; and outputting, by the AND gate circuit, a low level to the control chip via the output terminal; and the controlling the external parallel-connected node not to take power from the voltage supplying copper busbar includes: controlling, by the control chip, the external parallel-connected node not to take power from the voltage supplying copper busbar, and outputting, by the control chip, an abnormity alarm signal.

There are provided a device for preventing an entire cabinet from being powered down, a cabinet, and a method for preventing an entire cabinet from being powered down according to embodiments of the present disclosure. Each node is connected in parallel with one diode. An anode of the diode is grounded, and a cathode of the diode is connected to an external voltage supplying copper busbar via a fuse. When the diode is short-circuited, an excessively large current exceeding a fusing current threshold of the first protection circuit flows through the diode, and a connection line between the diode and the voltage supplying copper busbar is cut off, so as to prevent a positive electrode of the power supplying copper busbar from being shorted to the ground, and prevent a voltage of the power supplying copper busbar from being pulled down. Therefore, the power supplying copper busbar can continue to supply power to other nodes, thereby effectively improving the power supplying reliability of a cabinet server.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

In order to make objects, technical solutions and advantages of embodiments of the present disclosure more clear, the technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 1:
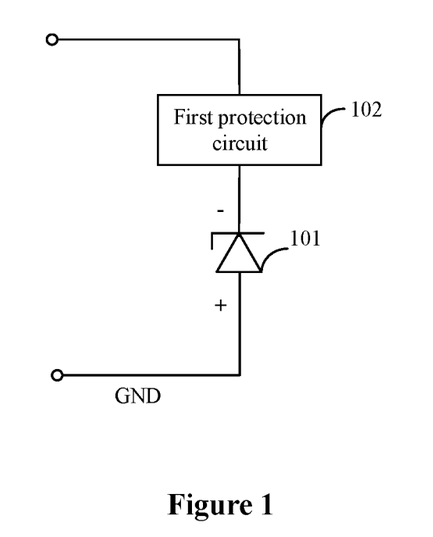
FIG. 1 shows a device for preventing an entire cabinet from being powered down according to an embodiment of the present disclosure.

As shown in FIG. 1, a device for preventing an entire cabinet from being powered down is provided according to an embodiment of the present disclosure. The device includes a diode 101 and a first protection circuit 102.

An anode of the diode 101 is grounded, and a cathode of the diode 101 is connected to an external voltage supplying copper busbar via the first protection circuit 102. The diode 101 is connected in parallel with an external node.

The first protection circuit 102 is arranged to monitor a current flowing through the diode 101, and cut off a connection line between the diode 101 and the voltage supplying copper busbar in a case that the current exceeds a preset fusing current threshold.

In the embodiment shown in FIG. 1, each node is connected in parallel with one diode. An anode of the diode is grounded, and a cathode of the diode is connected to an external voltage supplying copper busbar via a fuse. When the diode is short-circuited, an excessively large current exceeding a fusing current threshold of the first protection circuit flows through the diode, and a connection line between the diode and the voltage supplying copper busbar is cut off, so as to prevent a positive electrode of the power supplying copper busbar from being shorted to the ground, and prevent a voltage of the power supplying copper busbar from being pulled down. Therefore, the power supplying copper busbar can continue to supply power to other nodes, thereby effectively improving the power supplying reliability of a cabinet server.

Figure 2:
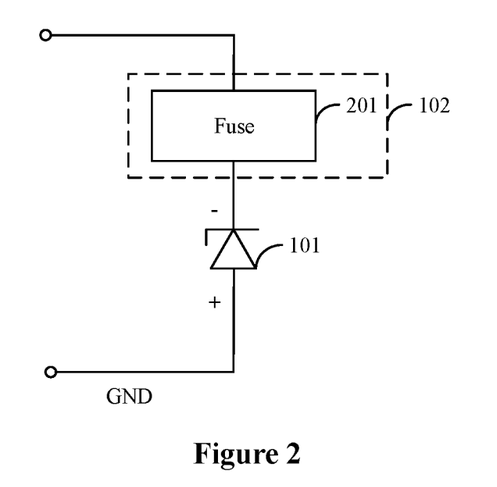
FIG. 2 shows a device for preventing an entire cabinet from being powered down according to another embodiment of the present disclosure.

As shown in FIG. 2, in another embodiment of the present disclosure, in order to prevent the positive electrode of the power supplying copper busbar from being shorted to the ground when the diode is short-circuited, the first protection circuit 102 includes a fuse 201.

A first connection terminal of the fuse 201 is connected to the cathode of the diode 101, and a second connection terminal of the fuse 201 is connected to the external voltage supplying copper busbar.

When the diode 101 is short-circuited, the fuse 201 is fused to cut off the connection line between the diode 101 and the external voltage supplying copper busbar.

In the embodiment of the present disclosure, a diode at a front end of each node is connected in series with a fuse, so that connection between the diode and the voltage supplying copper busbar can be instantly cut off by using the fuse when the diode is short-circuited, thereby keeping a voltage of the voltage supplying copper busbar at a constant voltage of 12V, so as to continue to provide power supplying voltages for other nodes. A connecting direction between the fuse and the diode may be determined according to user requirements. In this embodiment, the fuse is connected to the cathode of the diode, and thus a low level is outputted between the diode and the fuse when the diode is short-circuited.

Figure 3:
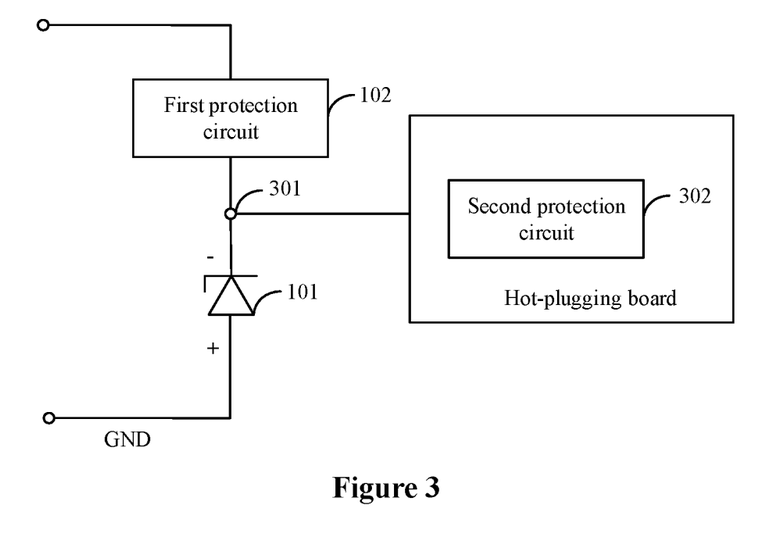
FIG. 3 shows a device for preventing an entire cabinet from being powered down according to another embodiment of the present disclosure.

As shown in FIG. 3, in an embodiment of the present disclosure, in order to maintain a faulty diode, the node corresponding to the short-circuited diode may be powered down under control, and the faulty diode may be found by troubleshooting nodes, so as to be maintained. Thus, the device further includes a signal pin 301 and a second protection circuit 302.

An input terminal of the signal pin 301 is arranged between the cathode of the diode 101 and the first protection circuit 102, and an output terminal of the signal pin 301 is connected to the second protection circuit 302.

The signal pin 301 is configured to: output a high level in a case that a voltage drop across the first protection circuit 102 is not zero, and output a low level in a case that the voltage drop across the first protection circuit 102 is zero.

The second protection circuit 302 is arranged on a hot-plugging board of the external parallel-connected node, and is configured to: control the external parallel-connected node to take power from the voltage supplying copper busbar in a case that the second protection circuit 302 receives the high level outputted by the signal pin 301, and control the external parallel-connected node not to take power from the voltage supplying copper busbar in a case that the second protection circuit 302 receives the low level outputted by the signal pin 301.

The voltage supplying copper busbar generally provides a power supplying voltage of 12V for each node. In the embodiment of the present disclosure, the diode is reversely connected to the power supplying copper busbar of 12V via the fuse. In a case that the diode is not short-circuited, the diode is forward turned on, and a line between the diode and the fuse is non-conductive. However, the voltage of 12V is divided by the diode and the fuse, for example, the diode obtains a voltage of 8V, and the fuse obtains a voltage of 4V. That is, in this case, there is a voltage drop across the signal pin arranged between the diode and the fuse, and the signal pin outputs a high level according to a predetermined level output rule. In addition, in a case that the diode is short-circuited, the fuse is fused, and the line between the diode and the fuse is cut off. In this case, there is no voltage drop across the signal pin arranged between the diode and the fuse, and the signal pin outputs a low level. In this way, the node can be controlled to or not to take power from the voltage supplying copper busbar of 12V based on a level outputted by the signal pin.

Figure 4:
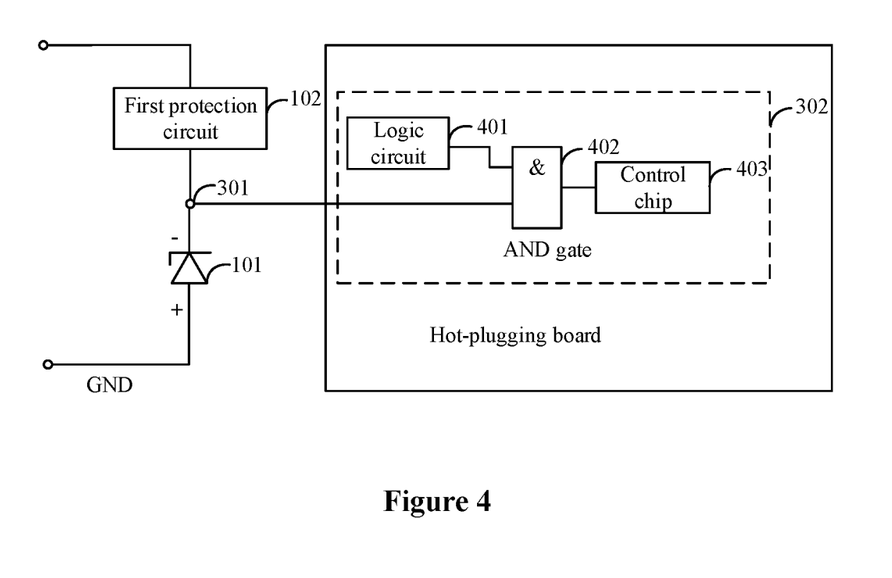
FIG. 4 shows a device for preventing an entire cabinet from being powered down according to another embodiment of the present disclosure.

As shown in FIG. 4, in an embodiment of the present disclosure, in order to control a node to or not to take power from the voltage supplying copper busbar and protect a chip in the node from being damaged, the second protection circuit 302 includes a logic circuit 401, an AND gate circuit 402, and a control chip 403.

The AND gate circuit 402 includes two input terminals and one output terminal.

The logic circuit 401 is arranged to monitor an operating state of the node; and output a high level in a case that the node operates normally.

A first input terminal of the AND gate circuit 402 is connected to the logic circuit 401, a second input terminal of the AND gate circuit 402 is connected to the signal pin 301, and the output terminal of the AND gate circuit 402 is connected to the control chip 403. The AND gate circuit 402 is configured to: receive the high level outputted by the logic circuit 401 via the first input terminal; output a high level to the control chip 403 via the output terminal in a case that the AND gate circuit 402 receives the high level outputted by the signal pin 301 via the second input terminal; and output a low level to the control chip 403 via the output terminal in a case that the AND gate circuit 402 receives the low level outputted by the signal pin 301 via the second input terminal.

The control chip 403 is configured to: control the node to operate normally in a case that the control chip 403 receives the high level outputted by the AND gate circuit 402 via the output terminal; and control the external parallel-connected node not to take power from the voltage supplying copper busbar and output an abnormity alarm signal, in a case that the control chip 403 receives the low level outputted by the AND gate circuit 402 via the output terminal.

It should be noted that, in the embodiment of the present disclosure, an AND gate circuit is arranged in the node in advance. The AND gate circuit is utilized to determine whether the level outputted by the signal pin is a high level or a low level. In a case that the determination result indicates that level outputted by the signal pin is a low level, the signal is inputted to a control chip in the node as an enabling signal, to cause a single node to be powered down. Further, the AND gate circuit has a high impedance, so as to effectively increase security of the chip in the node. For example, when the diode changes from a normal state to a short-circuit state, the level outputted by the signal pin transits from a high level 1 to a low level 0. In this case, if the logic circuit and the signal pin are directly connected to the control chip in the node, a level at an enable terminal of the control chip rapidly transits from a high level 1 to a low level 0, and the level at the enable terminal of the control chip rapidly transits from a low level 0 to a high level 1 after the diode is maintained, which may reduce service life of the chip, and causes the chip to be easily burned out. If an AND gate circuit is provided at a front end of the control chip, the level transition process can be slowed to a certain extent with the high impedance of the AND gate circuit. In this way, with the AND gate circuit, the determination on the level outputted by the signal pin can be implemented, while protecting the chip in the node from being damaged.

In an embodiment of the present disclosure, in order to cause the fuse to be fused instantly after the diode is short-circuited, while ensuring that the fuse is not fused in hot-plugging, a rated power of the fuse 201 should be greater than a power of the external parallel-connected node in hot-plugging and less than a power of the connected diode 101.

The fuse in the embodiment of the present disclosure should be carefully selected. For example, in a case that the power of the diode is 600 W and the rated power of the selected fuse is 1000 W, when the diode is short-circuited, a current generated due to the short-circuited diode may cause the fuse not to be fused, or to be slowly fused, since the power of the fuse is greater than the power of the diode. Further, since the diode may be regarded to as a wire when the diode is short-circuited, and the resistance of the fuse is quite small, the voltage supplying copper busbar of 12V may be considered to be shorted to the ground. According to the positive and negative charge neutralization principle, the voltage of the voltage supplying copper busbar is decreased from 12V, ideally to 0V. Practically, since the wire also has a quite small resistance, the voltage may be decreased to 2V to 3V. The power supplying voltage of 2V to 3V cannot cause each node in the cabinet to operate normally, and thus all nodes in the entire cabinet cannot operate normally. It is known from above that it is required to select a fuse having a rated power greater than the power of the fuse. For example, a fuse having a rated power of 500 W may be selected.

Further, a fuse having an excessively small rated power should not be selected. A fuse having a small power can be easily fused when the diode is short-circuited, so as to prevent the voltage supplying copper busbar from being shorted to the ground. However, since all the nodes support hot-plugging, a high voltage may be instantaneously generated in hot-plugging. If a fuse having a small power is selected, the fuse is fused in each hot-plugging. In this case, a normal diode cannot stabilize the voltage. Therefore, the rated power of the fuse should be greater than the power of the node in hot-plugging. For example, if the power of the node in hot-plugging is 300 W, a fuse having a rated power ranging from 300 W to 600 W may be selected.

Figure 5:
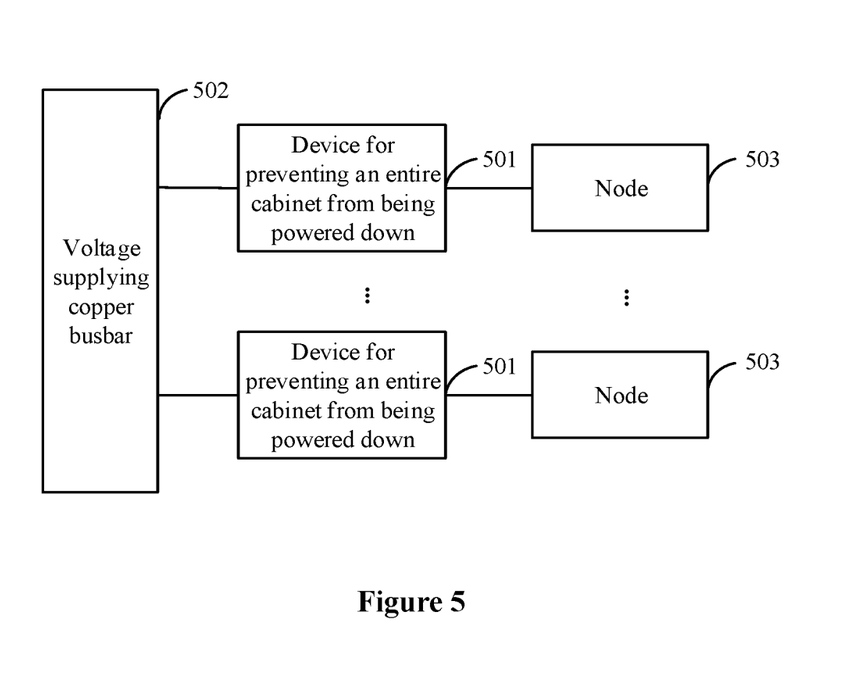
FIG. 5 shows a cabinet according to an embodiment of the present disclosure.

As shown in FIG. 5, a cabinet is provided according to an embodiment of the present disclosure. The cabinet includes: one or more devices 501 for preventing an entire cabinet from being powered down described above, a voltage supplying copper busbar 502, and one or more nodes 503.

Each of the one or more devices 501 for preventing an entire cabinet from being powered down is connected to the voltage supplying copper busbar in parallel with one of the nodes, and is configured to: stabilize a voltage of the parallel-connected node in hot-plugging, and cut off power supplying to the node when a short circuit occurs.

The voltage supplying copper busbar 502 is configured to provide a power supplying voltage for each of the one or more nodes 503.

Each of the one or more nodes 503 is configured to receive the power supplying voltage provided by the voltage supplying copper busbar 502.

Figure 6:
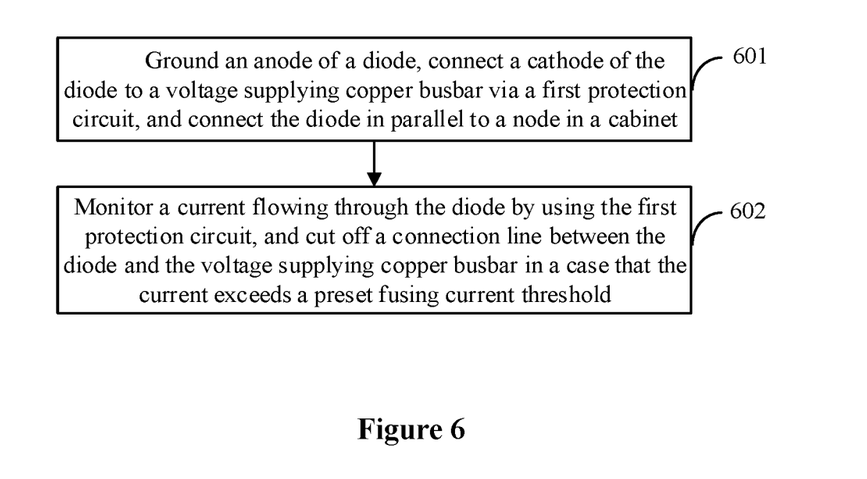
FIG. 6 shows a method for preventing an entire cabinet from being powered down according to an embodiment of the present disclosure.

As shown in FIG. 6, a method for preventing an entire cabinet from being powered down is provided according to an embodiment of the present disclosure. The method includes the following steps 601 to 602.

In step 601, an anode of a diode is grounded, a cathode of the diode is connected to a voltage supplying copper busbar via a first protection circuit, and the diode is connected in parallel with a node in the cabinet.

In step 602, a current flowing through the diode is monitored by using the first protection circuit, and a connection line between the diode and the voltage supplying copper busbar is cut off in a case that the current exceeds a preset fusing current threshold.

Each diode is connected in parallel with one diode. An anode of the diode is grounded, a cathode of the diode is connected to an external voltage supplying copper busbar via a fuse. When the diode is short-circuited, an excessively large current exceeding a fusing current threshold of the fuse flows through the diode, and the fuse is fused to cut off a connection line between the diode and the voltage supplying copper busbar, so as to prevent a positive electrode of the power supplying copper busbar from being shorted to the ground, and prevent a voltage of the power supplying copper busbar from being pulled down. Therefore, the power supplying copper busbar can continue to supply power to other nodes, thereby effectively improving the power supplying reliability of a cabinet server.

In an embodiment of the present disclosure, in order to cut off the connection line between the diode and the power supplying copper busbar to prevent the voltage of the power supplying copper busbar from being pulled down, the first protection circuit described in step 601 includes a fuse.

The process in step 601 may be performed by the following steps including: connecting a first connection terminal of the fuse to the cathode of the diode; and connecting a second connection terminal of the fuse to an external voltage supplying copper busbar. When the diode is short-circuited, the fuse is fused, to cut off the connection line between the diode and the voltage supplying copper busbar.

In the embodiment of the present disclosure, the fuse may be implemented in various manners. For example, a commonly used safety wire may be selected. A sleeve is arranged at the periphery of the safety wire. When the diode is short-circuited, the safety wire in the sleeve is fused to cut off the connection line. Therefore, the fuse may be selected according to user requirements. Further, the number of fuses connected in series with each diode may be determined according to the user requirements, which may be one, two or even more. In this embodiment, one fuse is selected.

Each diode is connected in series with one fuse. When the diode is short-circuited, since the current flowing through the diode exceeds the fusing current threshold of the fuse, the fuse is fused instantly, which prevents the power supplying copper busbar in the entire cabinet from being from being shorted to the ground, and thus the voltage of the power supplying copper busbar is not pulled down. In this way, the power supplying copper busbar can continue to provide a power supplying voltage for the node in the cabinet, to cause the node to operate normally.

In an embodiment of the present disclosure, in order to maintain a faulty diode, after step 602, the method further includes: arranging a signal pin between the cathode of the diode and the first protection circuit. The signal pin is configured to: output a high level in a case that a voltage drop across the first protection circuit is not zero, and output a low level in a case that the voltage drop across the first protection circuit is zero.

After step 602, the method further includes: controlling the external parallel-connected node to take power from the voltage supplying copper busbar in a case that the signal pin outputs a high level; and controlling the external parallel-connected node not to take power from the voltage supplying copper busbar in a case that the signal pin outputs a low level.

The signal pin is arranged to determine whether the diode is short-circuited on the condition that the voltage supplying copper busbar is prevented from being shorted to the ground by using the fuse. If it is determined that the diode is short-circuited, the control chip in the node may control the node not to take power from the voltage supplying copper busbar, and the system automatically issues an abnormal alarm. After hearing the alarm, the maintenance personnel may troubleshoot the nodes in the cabinet to find out the damaged diode at the front end of the node.

In an embodiment of the present disclosure, in order to prevent the control chip in the node from being damaged due to level transition, after step 602, the method further includes: arranging a logic circuit, an AND gate circuit and a control chip on the node; connecting a first input terminal of the AND gate circuit to the logic circuit, connecting a second input terminal of the AND gate circuit to the signal pin, and connecting an output terminal of the AND gate circuit to the control chip; outputting, by the logic circuit, a high level in a case that the node operates normally.

In a case that the AND gate circuit outputs a high level to the control chip via the output terminal, the control chip controls the node to operate normally. In a case that the AND gate circuit outputs a low level to the control chip via the output terminal, the control chip controls the external parallel-connected node not to take power from the voltage supplying copper busbar, and outputs an abnormity alarm signal.

In the embodiment of the present disclosure, the AND gate circuit is arranged to perform logical determination. For example, in a case that the diode is not short-circuited, the two input terminals of the AND gate receive two high levels 1. In this case, 1&1=1, that is, the AND gate outputs a high level 1. In addition, in a case that the diode is short-circuited, the two input terminals of the AND gate respectively receive a high level 1 and a low level 0. In this case, 1&0=0, that is, the AND gate output a low level 0.

The AND gate circuit is arranged at a front end of the control chip in the node, which may not only determine levels outputted by the signal pin and the logic circuit, but also prevent the control chip from being damaged due to rapid transition from a high level 1 to a low level 0 in the case of the diode being short-circuited and rapid transition from a low level 0 to a high level 1 after the diode is maintained, slowing the level transition, thereby extending the service life of the control chip, and further assisting in preventing the entire cabinet from being powered down.

The method for preventing an entire cabinet from being powered down is described below in detail by means of a cabinet shown in FIG. 7 in which a TVS corresponding to a node 1 is short-circuited, and a TVS corresponding to a node 2 operates normally. As shown in FIG. 8, the method may include the following steps 801 to 813.

In step 801, a power of a node in hot-plugging is pre-calculated from an oscillation waveform in hot-plugging by using an oscilloscope.

In the embodiment of the present disclosure, one signal terminal of an oscilloscope is connected to a voltage input port of a node, and the other signal terminal of the oscilloscope is grounded. The node connected to the oscilloscope is quickly taken out, which may take a time period, for example, assumed as 100 ms, and the oscilloscope displays a waveform illustrating a relationship between an instantaneous voltage and an instantaneous current in the time period of 100 ms. For example, the waveform is similar to a normal distribution waveform, in which a vertical axis y represents the instantaneous voltage and a horizontal axis x represents the instantaneous current. An area of a region surrounded by the entire waveform and the x axis is calculated by performing integral. The area indicates the power of the node in hot-plugging. Alternatively, the oscilloscope displays an average instantaneous voltage u and an average instantaneous current i in the time period of 100 ms. In the embodiment of the present disclosure, if the average instantaneous voltage u is 200V, and the average instantaneous current i is 5 A, the power $p_1$ of the node in hot-plugging is expressed as $p_1=u*i=200*10=1000$ W, where the power is in units of w.

In step 802, two fuses each having a rated power less than a power of a TVS and greater than the power of the node in hot-plugging are pre-selected.

In the embodiment of the present disclosure, the fuse should be selected according to actual circuits in the cabinet. Taking a safety wire as an example of the fuse, in order to ensure that the connection between the TVS and the power supplying copper busbar providing a power supplying voltage of 12V can be quickly cut off when the TVS is short-circuited, a rated power p of the safety wire should be less than a power $p_2$ of the TVS. i.e., $p<p_2$. That is, when the TVS is short-circuited, a current flowing through the TVS should be far greater than a fusing current threshold of the safety wire, to cause the fuse to be fused instantly, Otherwise, the safety wire cannot be fused or is fused slowly, which results in the power supplying copper busbar providing the power supplying voltage of 12V being shorted to the ground. Further, in order to prevent the safety wire from being fused in each hot-plugging, the rated power p of the safety wire should be greater than $p_1$, i.e., $p>p_1=1000$ W. In summary, the rated power p of the selected safety wire should meet a condition expressed as $p_1<p<p_2$.

In step 803, the TVS, the selected fuse, the power supplying copper busbar of the cabinet are connected to a logic circuit, an AND gate circuit and a control chip in each of a node 1 and a node 2.

Figure 7:
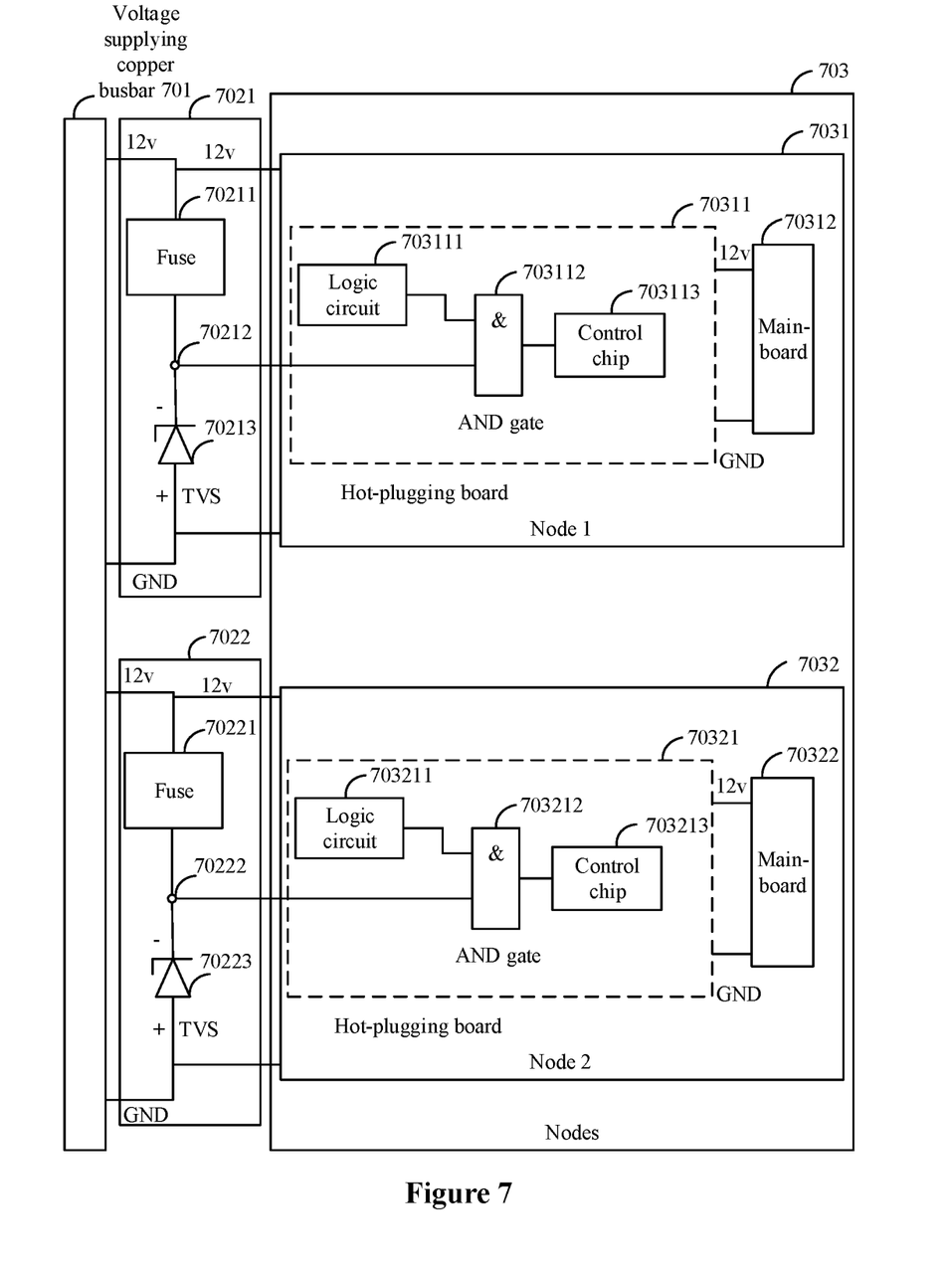
FIG. 7 shows a cabinet according to another embodiment of the present disclosure.
Figure 8:
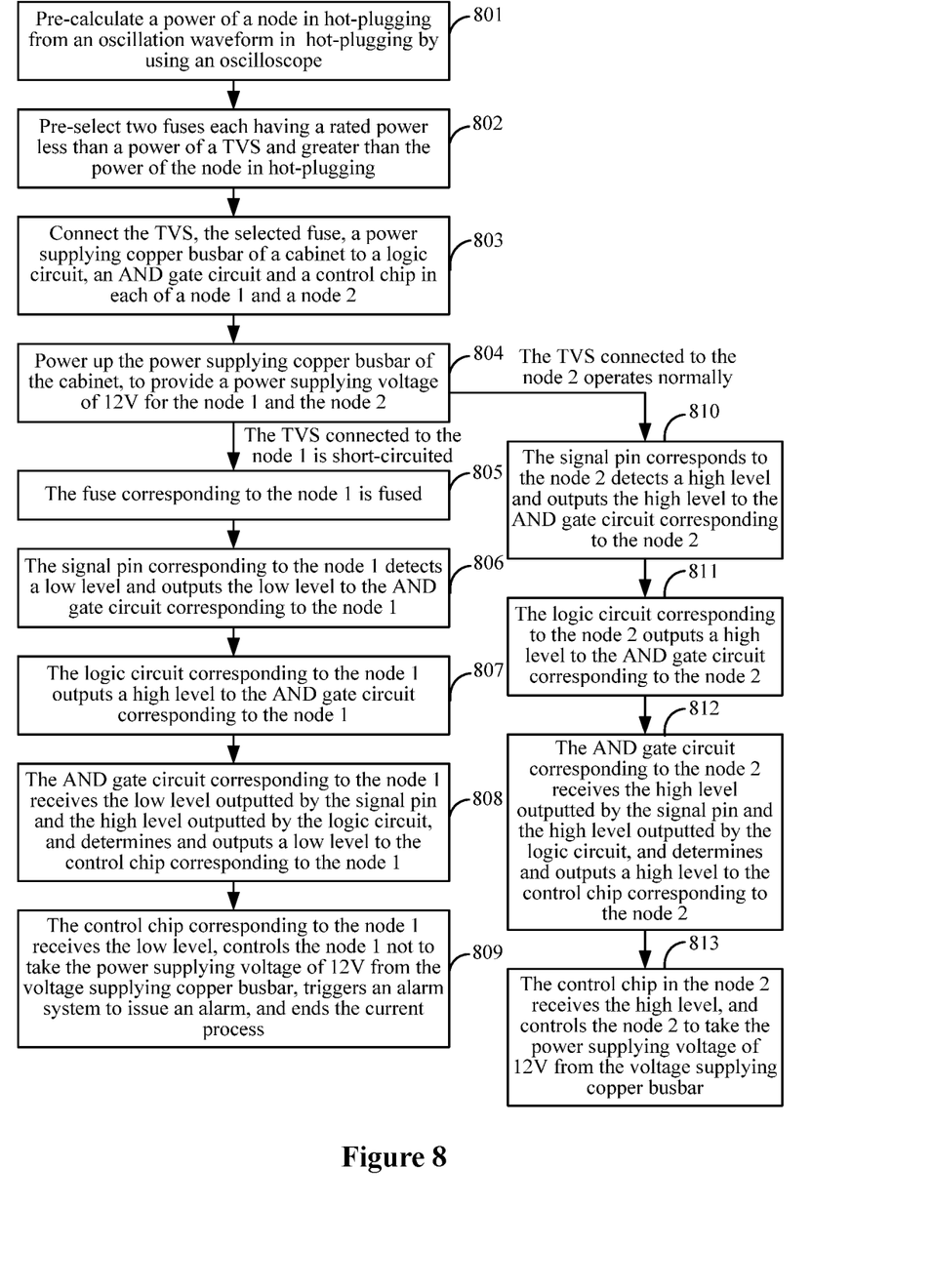
FIG. 8 shows a method for preventing an entire cabinet from being powered down according to another embodiment of the present disclosure.

The cabinet shown in FIG. 7 includes: a voltage supplying copper busbar 701, two devices 7022 for preventing an entire cabinet from being powered down, and nodes 703. In the embodiment of the present disclosure, the cabinet may include, for example, two nodes, i.e., a node 1 indicated by a reference numeral 7031 and a node 2 indicated by a reference numeral 7032 shown in FIG. 7. The device 7021 for preventing an entire cabinet from being powered down is connected in parallel with the node 1. The device 7022 for preventing an entire cabinet from being powered down is connected in parallel with the node 2. Each of the two devices for preventing an entire cabinet from being powered down is connected to the voltage supplying copper busbar 701 to take the power supplying voltage of 12V.

Taking the node 1 indicated by the reference numeral 7031 as an example, the device 7021 for preventing an entire cabinet from being powered down, connected in parallel with the node 1, includes a fuse 70211, a signal pin 70212, and a TVS 70213. One terminal of the fuse 70211 is connected to the voltage supplying copper busbar of 12V, and the other terminal of the fuse 70211 is connected to a cathode of the TVS 70213 via the signal pin 70212. An anode of the TVS 70213 is grounded. Therefore, once the TVS is short-circuited, the fuse is fused, so as to prevent the voltage supplying copper busbar of 12V from being shorted to the ground. The node 1 indicated by the reference numeral 7031 includes a hot-plugging board 70311, and a mainboard 70312. The hot-plugging board 70311 includes: a logic circuit 703111, an AND gate circuit 703112, and a control chip 703113. Two input terminals of the AND gate circuit 703112 are respectively connected to the signal pin 70212 and the logic circuit 703111, and an output terminal of the AND gate circuit 703112 is connected to the control chip 703113. The node 1 may be controlled to or not to take the power supplying voltage of 12V from the voltage supplying copper busbar by using the control chip 703113. The node 2 may be connected in the same manner as the above, which is not repeated herein.

In step 804, the power supplying copper busbar of the cabinet is powered up, to provide a power supplying voltage of 12V for the node 1 and the node 2. When the TVS connected to the node 1 is short-circuited, step 805 is performed. When the TVS connected to the node 2 operates normally, step 810 is performed.

In step 805, the fuse corresponding to the node 1 is fused.

As shown in FIG. 7, when the TVS 70213 is short-circuited, the fuse 70211 connected to the TVS 70213 is fused, so that a connection line where the TVS 70213 is located is disconnected, and thus the power supplying voltage of 12V is disconnected from a ground line GND. In this way, the voltage of 12V is not decreased, so that the voltage supplying copper busbar always remains at 12V.

In step 806, the signal pin corresponding to the node 1 detects a low level and outputs the low level to the AND gate circuit corresponding to the node 1.

It should be noted that, in the case that the TVS 70213 corresponding to the node 1 shown in FIG. 7 is short-circuited, the voltage at the cathode of the TVS 70213 is zero since the fuse is fused. In this case, the signal pin outputs a low level according to the predetermined level output rule.

In step 807, the logic circuit corresponding to the node 1 outputs a high level to the AND gate circuit corresponding to the node 1.

In the embodiment of the present disclosure, in a case that the node is in a power-on state and operates normally, the logic circuit outputs a high level.

In step 808, the AND gate circuit corresponding to the node 1 receives the low level outputted by the signal pin and the high level outputted by the logic circuit, and determines and outputs a low level to the control chip corresponding to the node 1.

As shown in FIG. 7, after the AND gate circuit 703112 in the node 1 receives the two levels at the input terminals, the AND gate circuit 703112 performs an AND operation on the low level and the high level and finally outputs a low level, and transmits the outputted low level to the control chip 703113. Further, the AND gate circuit 703112 have a high impedance, which slows the transition of the level inputted to the control chip 703113, and prevents the chip from being damaged due to the rapid transition between a high level and a low level.

In step 809, the control chip corresponding to the node 1 receives the low level, controls the node 1 not to take the power supplying voltage of 12V from the voltage supplying copper busbar, triggers an alarm system to issue an alarm, and ends the current process.

In the embodiment of the present disclosure, according to a predetermined rule that a level received by the control chip 703113 in the node 1 is valid in the case of a high level and is invalid in the case of a low level, when the control chip 703113 in the node 1 receives the low level outputted by the AND gate circuit 703112, the control chip 703113 is no longer enabled since the low level is invalid. That is, the control chip no longer controls the node 1 to take power from the voltage supplying copper busbar, that is, the node 1 is powered down. The system then automatically monitors that the node 1 is powered down, and triggers the alarm system to issue an abnormal alarm.

In step 810, the signal pin corresponds to the node 2 detects a high level and outputs the high level to the AND gate circuit corresponding to the node 2.

In the embodiment of the present disclosure, since the TVS corresponding to the node 2 operates normally, and the TVS is reversely connected to the power supplying copper busbar, no current flows through the TVS. That is, the fusing current threshold of the fuse is not reached, and thus the fuse 70221 corresponding to the node 2 in FIG. 7 is not fused. In FIG. 7, the TVS 70223 corresponding to the node 2 operates normally, and the line between the TVS 70223 and the fuse 70221 is non-conductive. Although there is no current in the line, the whole line is connected. In this case, the power supplying voltage of 12V is divided by the TVS 70223 and the fuse 70221, for example, the TVS 70223 obtains a power supplying voltage of 8V, and the fuse 70221 obtains a power supplying voltage of 4V. In this way, the signal pin 70222 corresponding to the node 2 can detect a voltage drop and outputs a high level according to the predetermined level output rule.

In step 811, the logic circuit corresponding to the node 2 outputs a high level to the AND gate circuit corresponding to the node 2.

In the embodiment of the present disclosure, since the node 2 is currently in a power-on state and operates normally, the logic circuit 703211 outputs a high level.

In step 812, the AND gate circuit corresponding to the node 2 receives the high level outputted by the signal pin and the high level outputted by the logic circuit, and determines and outputs a high level to the control chip corresponding to the node 2.

As shown in FIG. 7, after the AND gate circuit 703212 in the node 2 receives the two levels at the input terminals, the AND gate circuit 703212 performs an AND operation on the high level and the high level and finally output a high level, and transmits the outputted high level to the control chip 703213.

In step 813, the control chip in the node 2 receives the high level, and controls the node 2 to take the power supplying voltage of 12V from the voltage supplying copper busbar.

When the control chip 703213 receives the high level, the control chip 703213 is enabled since the high level is valid, to control the node 2 to take the power supplying voltage of 12V from the voltage supplying copper busbar, so that the node operates normally.

In summary, the embodiments of the present disclosure have at least the following beneficial effects.

In a first aspect, in an embodiment of the present disclosure, each node is connected in parallel with one diode. An anode of the diode is grounded, and a cathode of the diode is connected to an external voltage supplying copper busbar via a fuse. When the diode is short-circuited, an excessively large current exceeding a fusing current threshold of the first protection circuit flows through the diode, and a connection line between the diode and the voltage supplying copper busbar is cut off, so as to prevent a positive electrode of the power supplying copper busbar from being shorted to the ground, and prevent a voltage of the power supplying copper busbar from being pulled down. Therefore, the power supplying copper busbar can continue to supply power to other nodes, thereby effectively improving the power supplying reliability of a cabinet server.

In a second aspect, in an embodiment of the present disclosure, each diode is connected in series with one fuse. When the diode is short-circuited, since the current flowing through the diode exceeds the fusing current threshold of the fuse, the fuse is fused instantly, which prevents the power supplying copper busbar in the entire cabinet from being from being shorted to the ground, and thus the voltage of the power supplying copper busbar is not pulled down. In this way, the power supplying copper busbar can continue to provide a power supplying voltage for the node in the cabinet, to cause the node to operate normally.

In a third aspect, in an embodiment of the present disclosure, the signal pin is arranged to determine whether the diode is short-circuited on the condition that the voltage supplying copper busbar is prevented from being shorted to the ground by using the fuse. If it is determined that the diode is short-circuited, the control chip in the node may control the node not to take power from the voltage supplying copper busbar, and the system automatically issues an abnormal alarm. After hearing the alarm, the maintenance personnel may troubleshoot the nodes in the cabinet to find out the damaged diode at the front end of the node.

In a fourth aspect, in an embodiment of the present disclosure, the AND gate circuit is arranged at a front end of the control chip in the node, which may not only determine levels outputted by the signal pin and the logic circuit, but also prevent the control chip from being damaged due to rapid transition from a high level 1 to a low level 0 in the case of the diode being short-circuited and rapid transition from a low level 0 to a high level 1 after the diode is maintained, slowing the level transition, thereby extending the service life of the control chip, and further assisting in preventing the entire cabinet from being powered down.

The contents such as information interaction and execution processing between units in the above device are based on the same conception as the method embodiment of the present disclosure, and the specific details thereof may refer to the description in the method embodiment of the present disclosure, which are not repeated herein.

It should be noted that relationship terminologies herein such as "first", "second" are only used to distinguish one entity or operation from another entity or operation, rather than necessitating or implying an actual relationship or order between the entities or operations. Further, terms such as "include", "comprise" or any other variations thereof are intended to be non-exclusive. Therefore, a process, method, article or device including a series of elements includes not only the elements but also other elements that are not enumerated, or further includes the elements inherent for the process, method, article or device. Unless expressively limited otherwise, an element defined by the statement "comprising (including) a . . . " does not exclude the case that the process, method, article or device including the element may include other similar elements.

It can be understood by those skilled in the art that all or some of steps in the method embodiment may be implemented by hardware instructed by a program. The program may be stored in a computer-readable storage medium. When the program is performed, steps included in the above method embodiment can be performed. The storage medium may include a ROM, a RANI, a magnetic disk, an optical disk and other media that may store program codes.

It should be noted that the above only illustrates preferred embodiments of the present disclosure, and is only intended to describe the technical solutions of the present disclosure, and not to limit the protection scope of the present disclosure. Any modifications, equivalent replacements and variations made within the spirit and principle of the present disclosure shall fall within the protection scope of the present disclosure.

The invention claimed is:

1. A device for preventing an entire cabinet from being powered down, applied to each node in the cabinet, the device comprising:
   a diode;
   a signal pin;
   a first protection circuit; and
   a second protection circuit, wherein
   an anode of the diode is grounded, a cathode of the diode is connected to an external voltage supplying copper busbar via the first protection circuit, and the diode is connected in parallel with an external node,
   the first protection circuit is arranged to monitor a current flowing through the diode, and cut off a connection line between the diode and the voltage supplying copper busbar in a case that the current exceeds a preset fusing current threshold,
   an input terminal of the signal pin is arranged between the cathode of the diode and the first protection circuit, and an output terminal of the signal pin is connected to the second protection circuit,
   the signal pin is configured to: output a high level in a case that a voltage drop across the first protection circuit is not zero, and output a low level in a case that the voltage drop across the first protection circuit is zero, and
   the second protection circuit is arranged on a hot-plugging board in the external parallel-connected node, and is configured to: control the external parallel-connected node to take power from the voltage supplying copper busbar in a case that the second protection circuit receives the high level outputted by the signal pin, and control the external parallel-connected node not to take power from the voltage supplying copper busbar in a case that the second protection circuit receives the low level outputted by the signal pin.

2. The device according to claim 1, wherein the first protection circuit comprises a fuse, wherein
a first connection terminal of the fuse is connected to the cathode of the diode, and a second connection terminal of the fuse is connected to the external voltage supplying copper busbar; and
when the diode is short-circuited, the fuse is fused, to cut off the connection line between the diode and the external voltage supplying copper busbar.

3. The device according to claim 1, wherein the second protection circuit comprises:
a logic circuit;
an AND gate circuit; and
a control chip, wherein
the AND gate circuit comprises two input terminals and one output terminal;
the logic circuit is arranged to monitor an operating state of the node, and output a high level in a case that the node operates normally;
a first input terminal of the AND gate circuit is connected to the logic circuit, a second input terminal of the AND gate circuit is connected to the signal pin, and the output terminal of the AND gate circuit is connected to the control chip, and the AND gate circuit is configured to: receive the high level outputted by the logic circuit via the first input terminal, output a high level to the control chip via the output terminal in a case that the AND gate circuit receives the high level outputted by the signal pin via the second input terminal, and output a low level to the control chip via the output terminal in a case that the AND gate circuit receives the low level outputted by the signal pin via the second input terminal; and
the control chip is configured to: control the node to operate normally in a case that the control chip receives the high level outputted by the AND gate circuit via the output terminal; and control the external parallel-connected node not to take power from the voltage supplying copper busbar and output an abnormity alarm signal, in a case that the control chip receives the low level outputted by the AND gate circuit via the output terminal.

4. The device according to claim 2, wherein a rated power of the fuse is greater than a power of the external parallel-connected node in hot-plugging and less than a power of the connected diode.

5. A cabinet, comprising:
one or more devices for preventing an entire cabinet from being powered down according to claim 1;
a voltage supplying copper busbar; and
one or more nodes, wherein
each of the one or more devices for preventing an entire cabinet from being powered down is connected to the voltage supplying copper busbar in parallel with one of the nodes, and is configured to: stabilize a voltage of the parallel-connected node in hot-plugging, and cut off power supplying to the node when a short circuit occurs;
the voltage supplying copper busbar is configured to provide a power supplying voltage for each of the one or more nodes; and
each of the one or more nodes is configured to receive the power supplying voltage provided by the voltage supplying copper busbar.

6. A method for preventing an entire cabinet from being powered down, applied to each node in the cabinet, the method comprising:
grounding an anode of a diode, connecting a cathode of the diode to a voltage supplying copper busbar via a first protection circuit, and connecting the diode in parallel with a node in the cabinet;
monitoring, a current flowing through the diode by using the first protection circuit, and cutting off a connection line between the diode and the voltage supplying copper busbar in a case that the current exceeds a preset fusing current threshold; and
arranging a signal pin between the cathode of the diode and the first protection circuit, wherein
the signal pin is configured to: output a high level in a case that a voltage drop across the first protection circuit is not zero, and output a low level in a case that the voltage drop across the first protection circuit is zero; and
after cutting off the connection line between the diode and the voltage supplying copper busbar, the method further comprises: outputting, by the signal pin, a high level, and controlling the external parallel-connected node to take power from the voltage supplying copper busbar; and outputting, by the signal pin, a low level, and controlling the external parallel-connected node not to take power from the voltage supplying copper busbar.

7. The method according to claim 6, wherein
the first protection circuit comprises a fuse,
connecting a cathode of the diode to a voltage supplying copper busbar via a first protection circuit comprises: connecting a first connection terminal of the fuse to the cathode of the diode; and connecting a second connection terminal of the fuse to an external voltage supplying copper busbar; and
the cutting off a connection line between the diode and the voltage supplying copper busbar comprises: fusing the fuse to cut off the connection line between the diode and the external voltage supplying copper busbar, when the diode is short-circuited.

8. The method according to claim 6, further comprising:
arranging a logic circuit, an AND gate circuit and a control chip on the node;
connecting a first input terminal of the AND gate circuit to the logic circuit, connecting a second input terminal of the AND gate circuit to the signal pin, and connecting an output terminal of the AND gate circuit to the control chip; and
outputting, by the logic circuit, a high level in a case that the node operates normally, wherein
after outputting, by the signal pin, a high level and before controlling the external parallel-connected node to take power from the voltage supplying copper busbar, the method further comprises: receiving, by the AND gate circuit, the high level outputted by the signal pin and the high level outputted by the logic circuit; and outputting, by the AND gate circuit, a high level to the control chip via the output terminal;
the controlling the external parallel-connected node to take power from the voltage supplying copper busbar comprises: controlling, by the control chip, the node to operate normally;

after outputting, by the signal pin, a low level and before controlling the external parallel-connected node not to take power from the voltage supplying copper busbar, the method further comprises: receiving, by the AND gate circuit, the low level outputted by the signal pin and the high level outputted by the logic circuit; and outputting, by the AND gate circuit, a low level to the control chip via the output terminal; and the controlling the external parallel-connected node not to take power from the voltage supplying copper busbar comprises: controlling, by the control chip, the external parallel-connected node not to take power from the voltage supplying copper busbar, and outputting, by the control chip, an abnormity alarm signal.

9. The cabinet according to claim 5, wherein the first protection circuit comprises a fuse;

a first connection terminal of the fuse is connected to the cathode of the diode, and a second connection terminal of the fuse is connected to the voltage supplying copper busbar; and when the diode is short-circuited, the fuse is fused by itself, to cut off the connection line between the diode and the voltage supplying copper busbar.

10. The cabinet according to claim 5, wherein the second protection circuit comprises:

a logic circuit;

an AND gate circuit; and a control chip, wherein the AND gate circuit comprises two input terminals and one output terminal;

the logic circuit is arranged to monitor an operating state of the node, and output a high level in a case that the node operates normally;

a first input terminal of the AND gate circuit is connected to the logic circuit, a second input terminal of the AND gate circuit is connected to the signal pin, and the output terminal of the AND gate circuit is connected to the control chip, and the AND gate circuit is configured to: receive the high level outputted by the logic circuit via the first input terminal, output a high level to the control chip via the output terminal in a case that the AND gate circuit receives the high level outputted by the signal pin via the second input terminal, and output a low level to the control chip via the output terminal in a case that the AND gate circuit receives the low level outputted by the signal pin via the second input terminal; and the control chip is configured to: control the node to operate normally in a case that the control chip receives the high level outputted by the AND gate circuit via the output terminal; and control the external parallel-connected node not to take power from the voltage supplying copper busbar and output an abnormity alarm signal, in a case that the control chip receives the low level outputted by the AND gate circuit via the output terminal.

11. The cabinet according to claim 9, wherein a rated power of the fuse is greater than a power of the external parallel-connected node in hot-plugging and less than a power of the connected diode.

* * * * *